United States Patent
Zhang et al.

(10) Patent No.: US 10,127,029 B1
(45) Date of Patent: Nov. 13, 2018

(54) OPERATING SYSTEM INSTALLATION USING LOGICAL VOLUMES

(71) Applicant: Veritas Technologies LLC, Mountain View, CA (US)

(72) Inventors: Hui Zhang, Sichuan (CN); Lin Wang, Sichuan (CN); Jiang He, Sichuan (CN)

(73) Assignee: Veritas Technologies LLC, Mountain View, CA (US)

( * ) Notice: Subject to any disclaimer, the term of this patent is extended or adjusted under 35 U.S.C. 154(b) by 133 days.

(21) Appl. No.: 15/395,154

(22) Filed: Dec. 30, 2016

(51) Int. Cl.
*G06F 8/61* (2018.01)
*G06F 3/06* (2006.01)

(52) U.S. Cl.
CPC .............. *G06F 8/63* (2013.01); *G06F 3/0605* (2013.01); *G06F 3/067* (2013.01); *G06F 3/0644* (2013.01); *G06F 3/0665* (2013.01); *G06F 3/0673* (2013.01)

(58) Field of Classification Search
CPC .... G06F 3/0605; G06F 3/0644; G06F 3/0665; G06F 3/067; G06F 3/0673; G06F 8/60; G06F 8/61; G06F 8/63; G06F 8/64; G06F 9/44; G06F 9/4401; G06F 9/4406; G06F 9/4411; G06F 9/445
USPC ........................ 717/168–178; 718/1
See application file for complete search history.

(56) References Cited

U.S. PATENT DOCUMENTS

| | | | | |
|---|---|---|---|---|
| 7,293,272 B1* | 11/2007 | Okcu | ................ | G06F 13/102 719/321 |
| 7,313,719 B1* | 12/2007 | Elahee | ............... | G06F 11/1464 711/114 |
| 7,330,967 B1* | 2/2008 | Pujare | ................ | G06F 8/63 713/100 |
| 7,334,157 B1* | 2/2008 | Graf | .................. | G06F 8/63 714/13 |
| 7,360,030 B1* | 4/2008 | Georgiev | .......... | G06F 3/0605 707/999.009 |
| 7,565,517 B1* | 7/2009 | Arbon | ............... | G06F 8/63 709/220 |
| 7,769,990 B1* | 8/2010 | Okcu | ................. | G06F 9/4411 713/1 |
| 7,886,185 B1* | 2/2011 | Okcu | ................. | G06F 9/4411 711/162 |
| 8,103,747 B2* | 1/2012 | Trujillo | ............. | G06F 11/1469 709/220 |

(Continued)

OTHER PUBLICATIONS

F. Faerber, J. Dees, M. Weidner, S. Baeuerle and W. Lehner, "Towards a web-scale data management ecosystem demonstrated by SAP HANA," 2015 IEEE 31st International Conference on Data Engineering, Seoul, 2015, pp. 1259-1267. (Year: 2015).*

(Continued)

*Primary Examiner* — Andrew M. Lyons
(74) *Attorney, Agent, or Firm* — Campbell Stephenson LLP

(57) ABSTRACT

Disclosed herein are methods, systems, and processes to support hard drive installation of an operating system from a logical volume partition. An initial volatile memory disk is extracted from an operating system (OS) installation image. A logical volume binary and shared libraries are added to the extracted initial volatile memory disk and then executed. Executing the logical volume binary and the shared libraries modifies a process performed by an OS installation application. The extracted initial volatile memory disk is then repackaged into a modified initial volatile memory disk.

18 Claims, 12 Drawing Sheets

(56) References Cited

U.S. PATENT DOCUMENTS

| | | | | |
|---|---|---|---|---|
| 8,132,186 B1* | 3/2012 | Okcu | G06F 13/102 | 717/174 |
| 8,904,081 B1* | 12/2014 | Kulkarni | G06F 3/065 | 711/6 |
| 9,032,394 B1* | 5/2015 | Shi | G06F 9/4411 | 717/121 |
| 9,146,748 B1* | 9/2015 | Kumar | G06F 9/4411 | |
| 9,804,855 B1* | 10/2017 | Paningipalli | G06F 9/4401 | |
| 9,921,860 B1* | 3/2018 | Banga | G06F 9/45533 | |
| 2005/0132123 A1* | 6/2005 | Glaum | G06F 8/63 | 711/100 |
| 2008/0201705 A1* | 8/2008 | Wookey | G06F 8/658 | 717/175 |
| 2011/0296412 A1* | 12/2011 | Banga | G06F 9/5027 | 718/1 |
| 2012/0324280 A1* | 12/2012 | Wang | G06F 11/1417 | 714/15 |
| 2013/0055256 A1* | 2/2013 | Banga | G06F 21/53 | 718/1 |
| 2013/0132691 A1* | 5/2013 | Banga | G06F 21/53 | 711/162 |
| 2014/0101428 A1* | 4/2014 | Bennah | G06F 8/63 | 713/100 |
| 2014/0101429 A1* | 4/2014 | Bennah | G06F 8/63 | 713/100 |
| 2014/0101431 A1* | 4/2014 | Bennah | G06F 8/63 | 713/100 |
| 2014/0108774 A1* | 4/2014 | Bennah | G06F 8/60 | 713/2 |
| 2014/0237464 A1* | 8/2014 | Waterman | G06F 8/65 | 717/172 |
| 2014/0372744 A1* | 12/2014 | Xu | G06F 9/4416 | 713/2 |
| 2015/0032980 A1* | 1/2015 | Winokur | G06F 3/0665 | 711/162 |
| 2017/0017421 A1* | 1/2017 | Takei | G06F 3/06 | |

OTHER PUBLICATIONS

B. Mazumder and J. O. Hallstrom, "A fast, lightweight, and reliable file system for wireless sensor networks," 2016 International Conference on Embedded Software (EMSOFT), Pittsburgh, PA, 2016, pp. 1-10. (Year: 2016).*

R. Prodan and S. Ostermann, "A survey and taxonomy of infrastructure as a service and web hosting cloud providers," 2009 10th IEEE/ACM International Conference on Grid Computing, Banff, AB, 2009, pp. 17-25. (Year: 2009).*

* cited by examiner

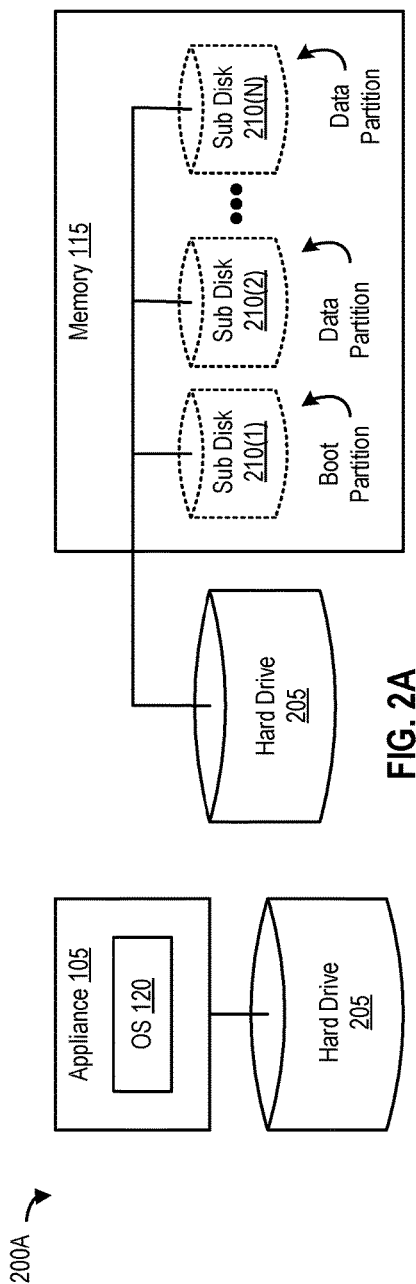
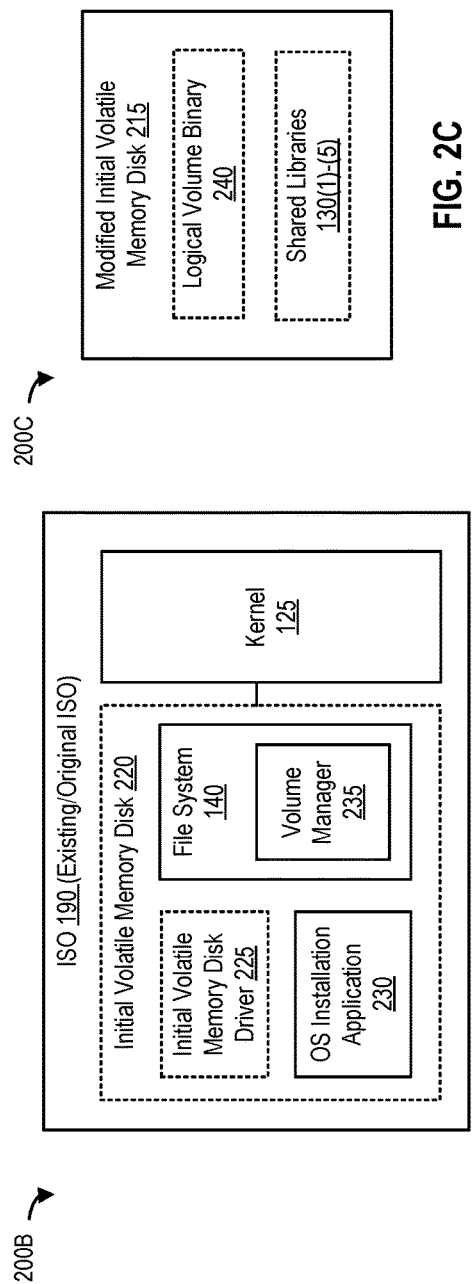

OPERATING SYSTEM INSTALLATION USING LOGICAL VOLUMES

FIELD OF THE DISCLOSURE

This disclosure is related to operating system installation. In particular, this disclosure is related to operating system installation in logical volume storage environments.

DESCRIPTION OF THE RELATED ART

Logical volume management (LVM) provides a method of allocating storage space on a storage device that is more flexible than conventional partitioning schemes. For example, partitions and block storage devices can be concatenated, striped together or otherwise combined into a larger virtual disk partitions called logical volumes that administrators can re-size or move, potentially without interrupting system use.

A typical LVM-based storage environment includes physical volumes (e.g., hard disks, partitions, or logical units) of an external storage device. Each physical volume is treated as being composed of a sequence of chunks called physical extents. Physical extents can be mapped one-to-one to logical extents, or multiple physical extents can be mapped to a single logical extent (e.g., using mirroring). Multiple logical extents can be pooled into a volume group. The pooled logical extents can then be concatenated together into virtual disk partitions called logical volumes.

An ISO image is an archive file that can be associated with a storage device (e.g., a hard drive, an optical disc, or the like), and is a type of disk image and includes contents from every written sector on the data storage device, including the data storage device's file system. Therefore, because an ISO image is a file that includes a copy of a file system, an ISO image can be useful to install and/or update an operating system in LVM-based storage environments.

SUMMARY OF THE DISCLOSURE

Disclosed herein are methods, systems, and processes to support hard drive installation of an operating system from a logical volume partition. One such method involves extracting an initial volatile memory disk from an operating system (OS) installation image. In this example, the initial volatile memory disk includes an OS installation application, and an initial volatile memory disk driver that is not present in the computing device.

In some embodiments, the method involves adding a logical volume binary and one or more shared libraries to the extracted initial volatile memory disk, and executing the logical volume binary and one or more shared libraries. In this example, executing the logical volume binaries and one or more shared libraries modifies a process performed by the OS installation application. The method also involves repackaging the extracted initial volatile memory disk into a modified initial volatile memory disk.

In other embodiments, the method involves storing a kernel and the repackaged initial volatile memory disk on a boot partition and storing an ISO image on a logical volume, and permits an OS installation operation from the logical volume as part of the process performed by the OS installation application. In some embodiments, the process includes performing the OS installation operation by installing or updating an OS of the computing device from the logical volume associated with the computing device.

In one embodiment, modifying the process in the OS installation application involves adding a device mapper to a kernel of the OS that boots a computing device to start the OS installation operation after decompressing the initial volatile memory disk into a folder, and determining that one or more nodes listed in the device mapper correspond to one or more mapped devices loaded by the device mapper. In another embodiment, modifying the process in the OS installation application involves scanning one or more sub disks associated with the computing device to identify one or more physical volumes and one or more logical volume groups, and activating each logical volume in the one or more logical volume groups by executing the logical volume binaries.

The foregoing is a summary and thus contains, by necessity, simplifications, generalizations and omissions of detail; consequently those skilled in the art will appreciate that the summary is illustrative only and is not intended to be in any limiting. Other aspects, features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features and advantages made apparent to those skilled in the art by referencing the accompanying drawings.

FIG. 2A is a block diagram 200A of an LVM-based storage environment, according to one embodiment of the present disclosure.

FIG. 2B is a block diagram 200B of an existing ISO, according to one embodiment of the present disclosure.

FIG. 2C is block diagram 200C of a modified initial volatile memory disk, according to one embodiment of the present disclosure.

Figure 1:
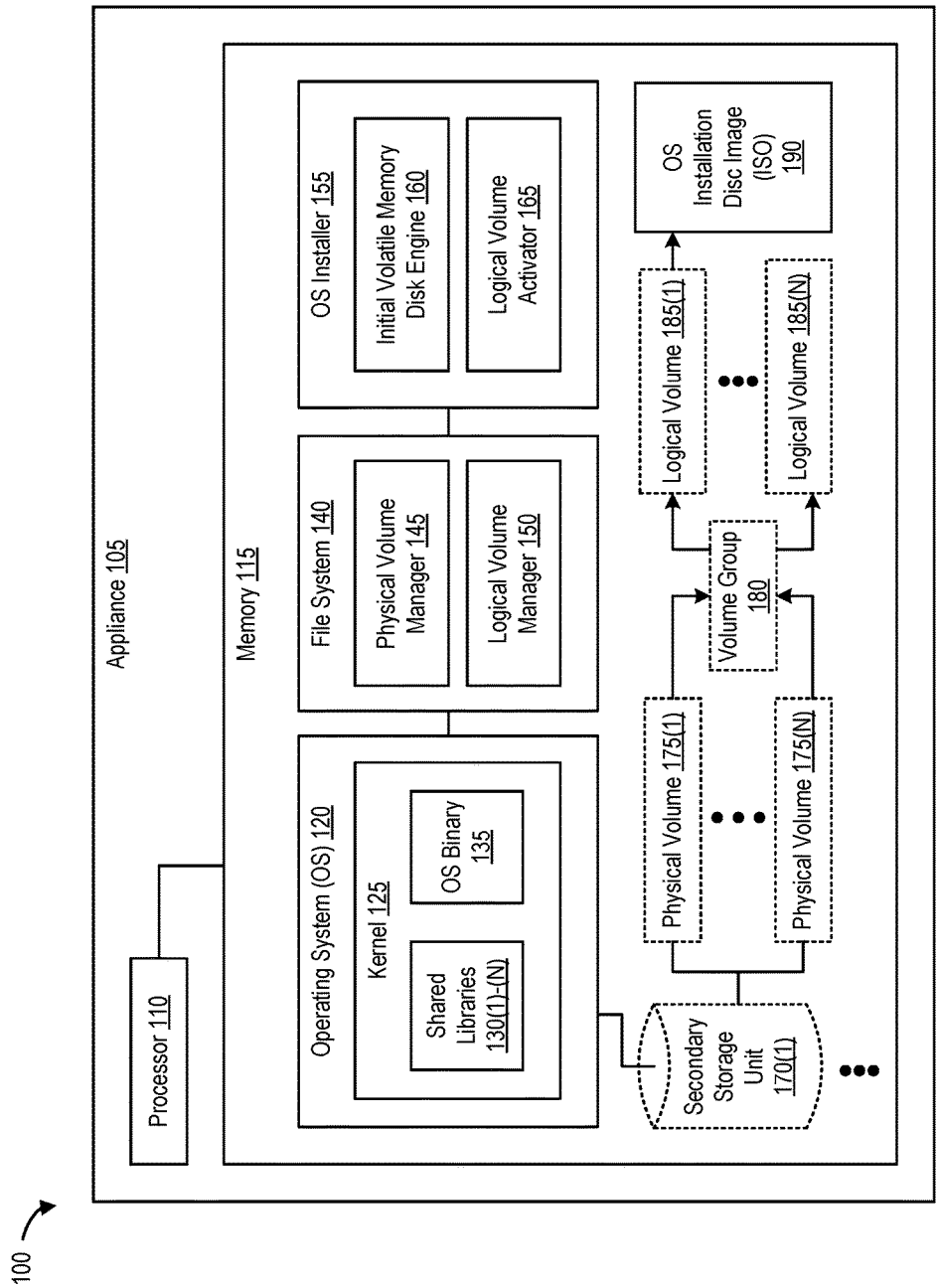
FIG. 1 is a block diagram 100 of a computing system that performs operating system (OS) installation using logical volumes, according to one embodiment of the present disclosure.

While the disclosure is susceptible to various modifications and alternative forms, specific embodiments of the disclosure are provided as examples in the drawings and detailed description. It should be understood that the drawings and detailed description are not intended to limit the disclosure to the particular form disclosed. Instead, the intention is to cover all modifications, equivalents and alternatives falling within the spirit and scope of the disclosure as defined by the appended claims.

DETAILED DESCRIPTION

Introduction

One type of computing appliance (or more simply, an appliance) is a discrete hardware computing device with integrated software (e.g., firmware, installed software, and/or the like), specifically designed to provide a specific computing resource (e.g., access to one or more business services). Another type of appliance is a virtual appliance. A virtual appliance can be configured to provide similar functionality as a dedicated hardware appliance, but the virtual appliance is distributed (e.g., to customers), as software (e.g., a virtual machine image) that executes "on top" of a hypervisor, or for a hypervisor-enabled device. In addition, a customer can deploy an appliance by installing software (e.g., storage software, operating system (OS) software, and so on) on a dedicated computing device, for example.

Appliances can be configured to take advantage of the benefits of logical volume management and/or logical volume manager (LVM) based storage environments, and can be implemented in such LVM-based storage environments. As previously noted, LVM provides a method of allocating space on a storage device that is more flexible than conventional partitioning schemes. The benefits of LVM-based storage environments are many, and a few of these benefits are now described.

First, partitions and block storage devices can be concatenated, striped together or otherwise combined into a larger virtual disk partitions called logical volumes that administrators can re-size or move, potentially without interrupting system use. Second, LVM permits the creation of single logical volumes of multiple physical volumes or entire hard disks, allowing for dynamic volume resizing. Third, LVM supports the management of large hard disk farms by allowing disks to be added and replaced without downtime or service disruption (e.g., in combination with hot swapping). Fourth, on small systems (e.g., a desktop computer), instead of having to estimate (at installation time) the size that might be needed for a partition, LVM allows file systems to be easily resized as needed. And fifth, LVM can be useful for performing consistent backups by taking snapshots of logical volumes.

A typical LVM-based storage environment includes physical volumes (e.g., hard disks, partitions, or logical unit) of an external storage device. Each physical volume is treated as being composed of a sequence of portions called physical extents. Physical extents can be mapped one-to-one to logical extents, or multiple physical extents can be mapped to a single logical extent (e.g., using mirroring). Multiple logical extents can be pooled into a volume group. The pooled logical extents can then be concatenated together into virtual disk partitions called logical volumes.

An ISO image is an archive file that can be associated with a storage device (e.g., a hard drive, an optical disc, or the like). An ISO image is a type of disk image and includes contents from every written sector on the data storage device, including the data storage device's file system. Because an ISO image is a file that includes a copy of a file system, an ISO image can be useful to install and/or update an operating system in LVM-based storage environments.

Because appliances can be used in LVM-based storage environments, it will be appreciated that a need may arise to upgrade the appliance's OS or install a new OS on the appliance. In LVM-based storage environments, it would be desirable to perform such OS upgrading or OS installation from an LVM-controlled partition associated with the appliance (e.g., from an ISO image located on a local hard drive whose partition(s) are logical volume partitions controlled by a LVM).

Unfortunately, operating system distributions do not support OS installation from an ISO image located on a LVM-controlled partition, particularly where all available partitions are LVM-controlled. The available alternatives for OS installation in such a scenario are undesirable to say the least, for at least for the following reasons. First, an available boot partition cannot be used for OS installation because the small size of the boot partition (e.g., 200 MB) cannot be enlarged to accommodate the large size of an ISO image (e.g., 4 GB). Second, providing an ISO image on removable media is undesirable in business environments where system security is important, and also because appliances are typically implemented in closed computing environments.

Third, provisioning an existing physical volume in an LVM-controlled storage environment for OS installation is inefficient because data from the physical volume has to be first copied to other physical volumes. Then, the physical volume needs to be removed from its volume group and has to be reformatted to include a file system. What's more, moving data between physical volumes is extremely slow, and a given physical volume may not have enough free space to hold data from another physical volume.

Therefore, it should be noted that operating system distributions do not support OS installation from an ISO image located on an LVM-controlled partition, and the available alternatives are inefficient, laborious, and undesirable. Disclosed herein are methods, systems, and processes that support OS installation using logical volumes.

Example Computing Systems to Perform OS Installation Using Logical Volumes

FIG. 1 is a block diagram 100 of a computing system that performs operating system (OS) installation using logical volumes, according to one embodiment. The computing system of FIG. 1 includes an appliance 105. Appliance 105 includes a processor 110 and a memory 115. Appliance 105 can be any of a variety of different types of computing devices, including a server, personal computing device, laptop computer, cellular phone, or the like.

Memory 115 includes an operating system (OS) 120. OS 120 includes a kernel 125. Kernel 125 includes shared libraries 130(1)-(N) (e.g., dynamic-link libraries (DLLs)), and at least one OS binary 135. File system 140 can be any type of file system and controls how data is stored and retrieved by appliance 105. File system 140 implements a physical volume manager 145 (which manages physical volumes associated with appliance 105), and a logical volume manager 150 (which manages logical volumes associated with appliance 105). In one embodiment, physical volume manager 145 and logical volume manager 150 together constitute and are part of a Logical Volume Manager (LVM), which in this example, is a software application that executes in memory 115 of appliance 105 and provides logical volume management. Therefore, appliance 105 is implemented in a LVM-based storage environment.

Memory 115 also includes OS installer 155. OS installer 155 upgrades an existing OS of appliance 105 or installs a new OS on appliance 105. OS installer 155 includes an initial volatile memory disk engine 160 and a logical volume activator 165. Initial volatile memory disk engine 160 can create and manage a volatile memory disk such as a RAM disk. A RAM disk is a block of random-access memory (e.g., primary storage or volatile memory) that is treated as a disk drive (e.g., secondary storage) by an operating system, its installation, and/or its components (e.g., initial volatile memory disk engine 160). Therefore, initial volatile memory disk engine 160 can control and manage a scheme (e.g., an initial ramdisk/initial RAM disk) to load a (temporary) root file system into memory 115, for example, for OS installation purposes.

A root file system (e.g., file system 140 in initial volatile memory disk 220) is a file system that is contained on the same partition on which the root directory is located and is the file system on which all other file systems can be mounted. A root file system includes files necessary for booting and operating appliance 105, such appliance 105 is in a state that other file systems (e.g., OS file systems) can be mounted and/or installed. File system 140 (e.g., in initial volatile memory disk 220—not an existing file system in the appliance's OS) can be modified to permit OS installation from an ISO image located on a hard drive that has LVM-controlled partitions. Appliance 105 also includes a secondary storage unit 170(1) (e.g., a local hard drive or an external storage device). Physical volumes 175(1)-(N) of secondary storage unit 170(1) can pooled into a volume group 180 as logical extents mirrored to physical extents of physical volumes 175(1)-(N). Logical volumes 185(1)-(N) can then be created from volume group 180. Appliance 105 can be implemented in an LVM-based storage environment as shown in FIG. 1.

OS installation disc image 190 (e.g., in ISO format) is a file associated with a storage device (e.g., an optical disc, a hard disk, a Universal Serial Bus (USB) drive, and the like) and is a binary image that includes the contents and structure of the storage device (independent of the storage device's file system). ISO 190 includes a copy of a root file system and can be used to install or upgrade an OS on appliance 105 (e.g., OS 120), particularly where appliance 105 is implemented in LVM-based storage environments as shown in FIG. 1 (e.g., using initial volatile memory disk engine 160 and logical volume activator 165 in OS installer 155).

FIG. 2A is a block diagram 200A of an LVM-based storage environment, according to one embodiment. Appliance 105 includes OS 120 and a hard drive 205 (e.g., secondary storage unit 170(1) as shown in FIG. 1). LVM (e.g., logical volume manager 150), when implemented as part of file system 140, or independently by memory 115 of appliance 105, maps physical extents of physical volumes of hard drive 205 to logical extents (e.g., sub disks 210(1)-(N) as shown in FIG. 2A). For example, sub disk 210(1) is a boot partition (e.g., 200 MB), sub disk 210(2) is a data partition, and sub disk 210(N) is a data partition. These sub disks of data partitions (not a sub disk of a boot partition) can be pooled into volume group 180 and the pooled sub disks can then be concatenated together into logical volumes 185(1)-(N). In this manner, one or more partitions associated with appliance 105 can be controlled by LVM 150.

FIG. 2B is a block diagram 200B of an existing/original ISO (e.g., ISO 190), according to one embodiment of the present disclosure. ISO 190 includes an initial volatile memory disk 220 (e.g., an initial ramdisk). Initial volatile memory disk 220 further includes an initial volatile memory disk driver 225, an OS installation application 230, a file system 140 (e.g., a root file system with volume manager 235), and a kernel 125. Volume manager 235 can be configured to implement physical volume manager 145 and LVM 150 in appliance 105. File system 140 and kernel 125 can be loaded on appliance 105 using ISO 190.

FIG. 2C is block diagram 200C of a modified initial volatile memory disk, according to one embodiment of the present disclosure. Because operating system distributions do not support OS installation from an ISO image located on a LVM-controlled partition, and the available alternatives are inefficient, laborious, and undesirable, initial volatile memory disk 220 extracted from ISO 190 can be modified to support OS installation on LVM-controlled partitions. Initial volatile memory disk 220 extracted from ISO 190 can be modified by adding a logical volume binary 235 and shared libraries 130(1)-(5) to support OS installation on LVM-controlled partitions. OS installer 155, which includes initial volatile memory disk engine 160, can be used to add logical volume binary 235 (e.g., a LVM binary) and shared libraries 130(1)-(N) (e.g., DLLs relevant to LVM) to initial volatile memory disk 220, and thus generate a modified initial volatile memory disk (e.g., modified initial volatile memory disk 215).

Figure 2D:
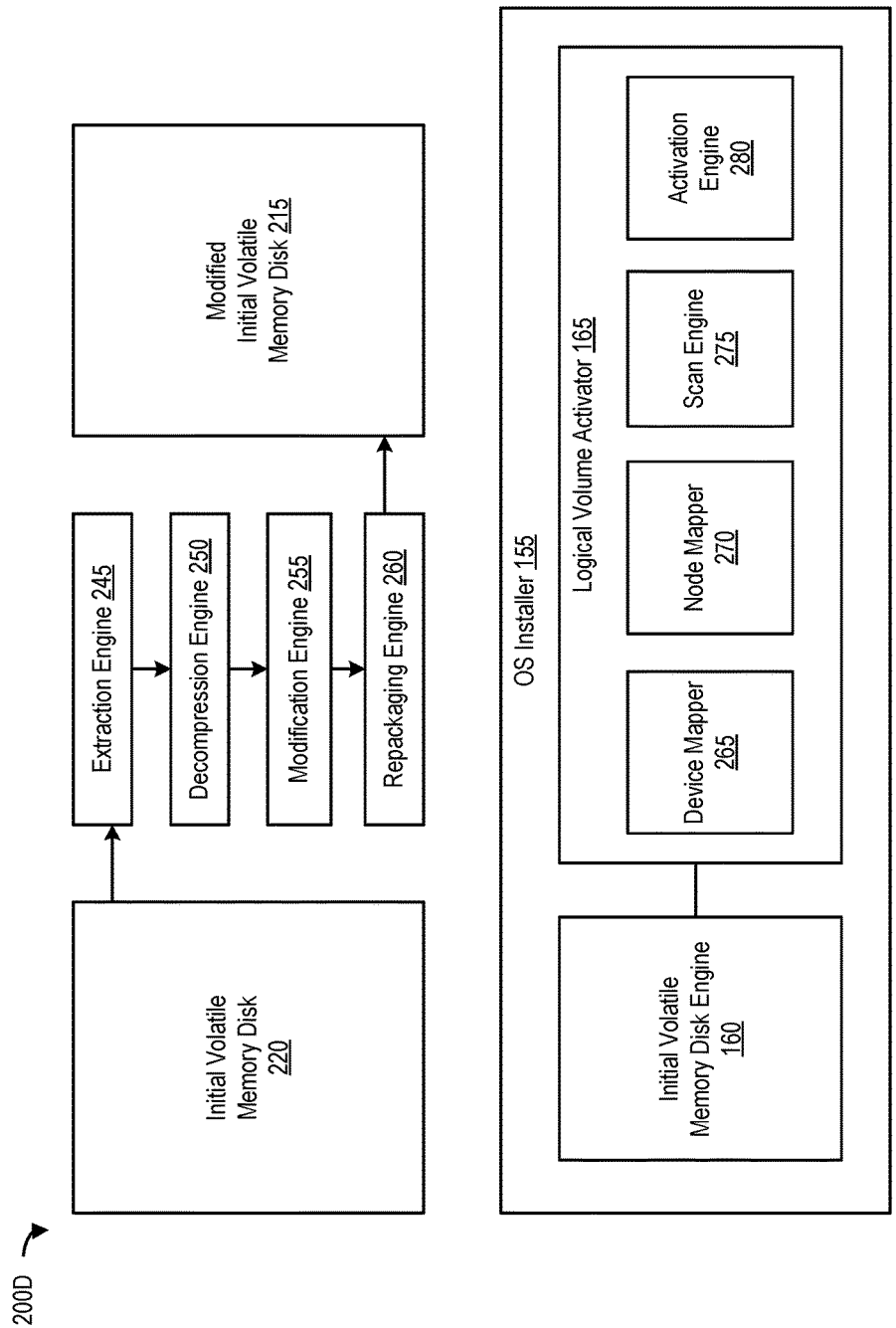
FIG. 2D is a block diagram 200D of an OS installer, according to one embodiment of the present disclosure.

FIG. 2D is a block diagram 200D of an OS installer, according to one embodiment. OS installer 155 includes initial volatile memory disk engine 160 (e.g., to modify an extracted initial volatile memory disk) and logical volume activator 165 (e.g., to activate logical volume management for performing OS installation from an ISO image located on a logical volume partition). As shown in FIG. 2D, an extraction engine 245, a decompression engine 250, a modification engine 255, and a repackaging engine 260 can be used to generate a modified initial volatile memory disk (e.g., by a computing device that is not appliance 105). For example, extraction engine 245 extracts initial volatile memory disk 220 from ISO 190 (existing ISO). Initial volatile memory disk 220 includes OS installation application 230 and initial volatile memory disk driver 225. It should be noted that initial volatile memory disk driver 225 is not present in appliance 105.

Decompression engine 250 decompress the initial volatile memory disk 220 (e.g., into a folder). Modification engine 255 adds logical volume binary 240 and one or more shared libraries (e.g., one or more of shared libraries 130(1)-(N)) to the extracted initial volatile memory disk. Repackaging engine 260 repackages the extracted initial volatile memory disk into a modified initial volatile memory disk. Logical volume activator 165 of appliance 105 (e.g., not the computing device that creates the modified initial volatile memory disk) then executes the logical volume binary and one or more shared libraries (e.g., DLLs relevant to LVM). Executing the logical volume binaries and one or more shared libraries modifies a process performed by OS installation application 230.

In certain embodiments, OS installer 155 containing the modified initial volatile memory disk is stored on a boot partition associated with appliance 105 (e.g., by a computing device that is not appliance 105). It should be noted that in this example, OS installer 155 is the combination of a kernel (e.g., vmlinuz) and the modified initial volatile memory disk located in the boot partition. OS installer 155 can then be used to perform an OS installation operation from the logical volume as part of the (modified) process performed by OS installation application 230. In some embodiments, the process includes performing the OS installation operation by installing or updating an OS (e.g., OS 120) of appliance 105 from the logical volume associated with appliance 105 (e.g., logical volumes 185(1)-(N)).

As previously noted, logical volume activator 165 then executes the logical volume binary and one or more shared libraries (e.g., DLLs relevant to LVM). Executing logical volume binary 240 and one or more of shared libraries 130(1)-(N) that are relevant to LVM results in modification of a process for performing OS installation used by OS installation application 230. In one embodiment, device mapper 265 (e.g., modprobe dm_mod) adds a device mapper to kernel 125 of OS 120 of appliance 105. In another embodiment, node mapper 270 (e.g., dmsetup mknodes) then determines that one or more nodes listed in device mapper 265 correspond to one or more mapped devices loaded by device mapper 265.

In some embodiments, scan engine 275 (e.g., vgscan) scans one or more sub disks associated with appliance 105 (e.g., sub disks 210(1)-(N) as shown in FIG. 2A) to identify one or more physical volumes and one or more logical volume groups. In other embodiments, activation engine 280 (e.g., vgchange-ay) activates each logical volume in one or more logical volume groups. Therefore, execution of logical volume binary 240 and one or more of shared libraries 130(1)-(N) that are relevant to LVM by logical volume activator 165 results LVM-aware partitions that can be used for OS installation from a (modified) ISO image (e.g., ISO 190).

Figure 3A:
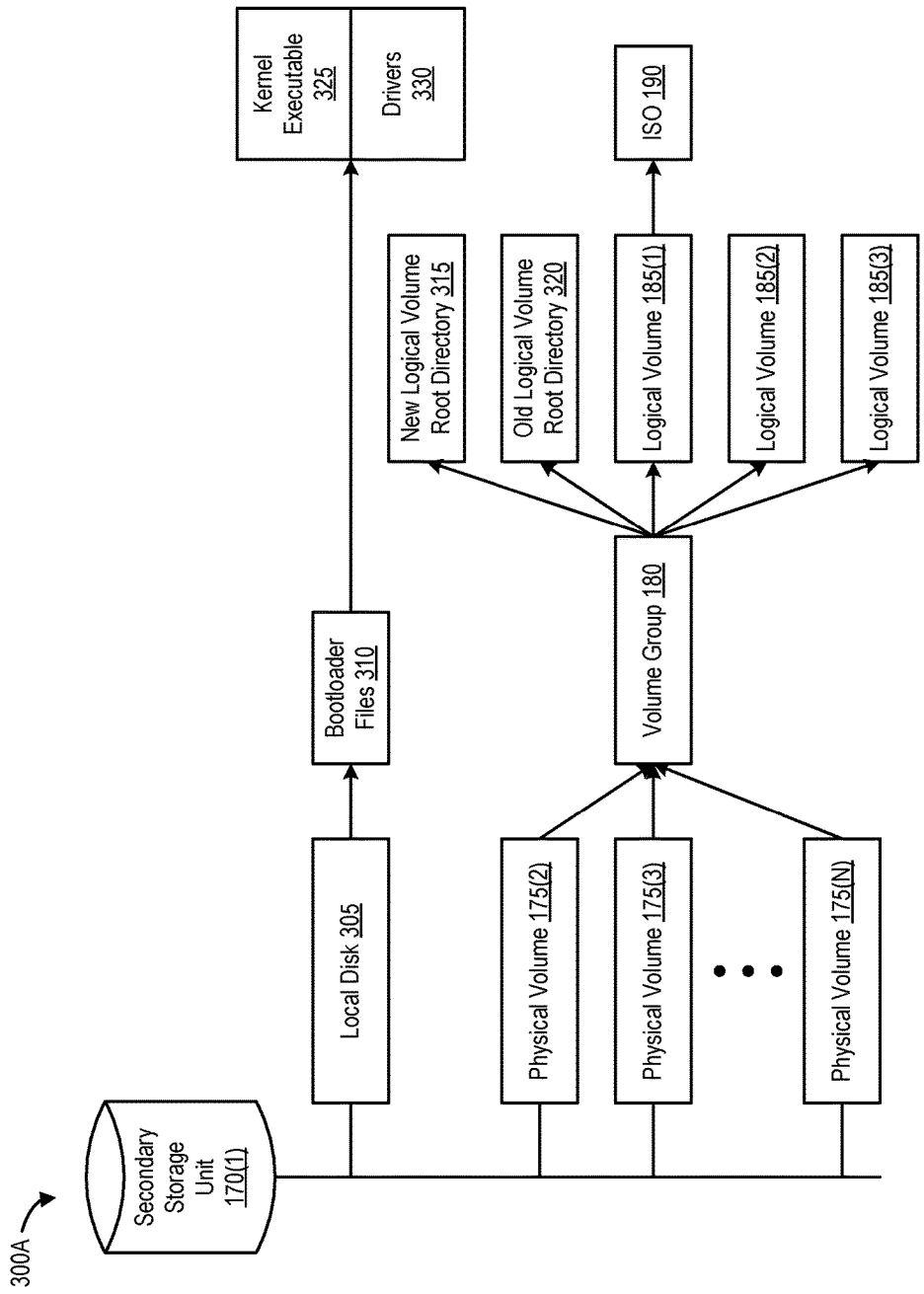
FIG. 3A is a block diagram 300A of an LVM-based storage environment that supports OS installation from an ISO, according to one embodiment of the present disclosure.

FIG. 3A is a block diagram 300A of an LVM-based storage environment that supports OS installation from an ISO, according to one embodiment. As shown in FIG. 3A, secondary storage unit 170(1) associated with appliance 105 includes physical volumes 175(2)-(N), some of which are can be used to create volume group 180. At least one logical disk (e.g., local disk 305) can be designated for bootloader files 310 (e.g., /boot—a partition that holds kernel 125 and initial volatile memory disk 220 used to boot appliance 105).

Physical volumes 175(2)-(N) can be used to create volume group 180. Logical volumes 185(1)-(3) as well as a new logical volume root directory 315 (e.g., Lv-newroot—a logical volume on which a root partition of a new OS distribution can be installed) and an old logical volume root directory 320 (e.g., Lv-root—a logical volume that holds a root partition of an existing OS distribution) can be created from volume group 180.

As shown in FIG. 3A, ISO 190 (e.g., the original ISO) can be copied to logical volume 185(1) (or to logical volumes 185(2) or 185(3)). Kernel executable 325 (e.g., vmlinuz—a kernel which can be used to boot appliance 105 to start OS installation), as well as drivers 330 (e.g., initrd.img—drivers such as initial volatile memory disk driver 225 that kernel 125 does not have) can also be provisioned by OS installer 155.

Figure 3B:
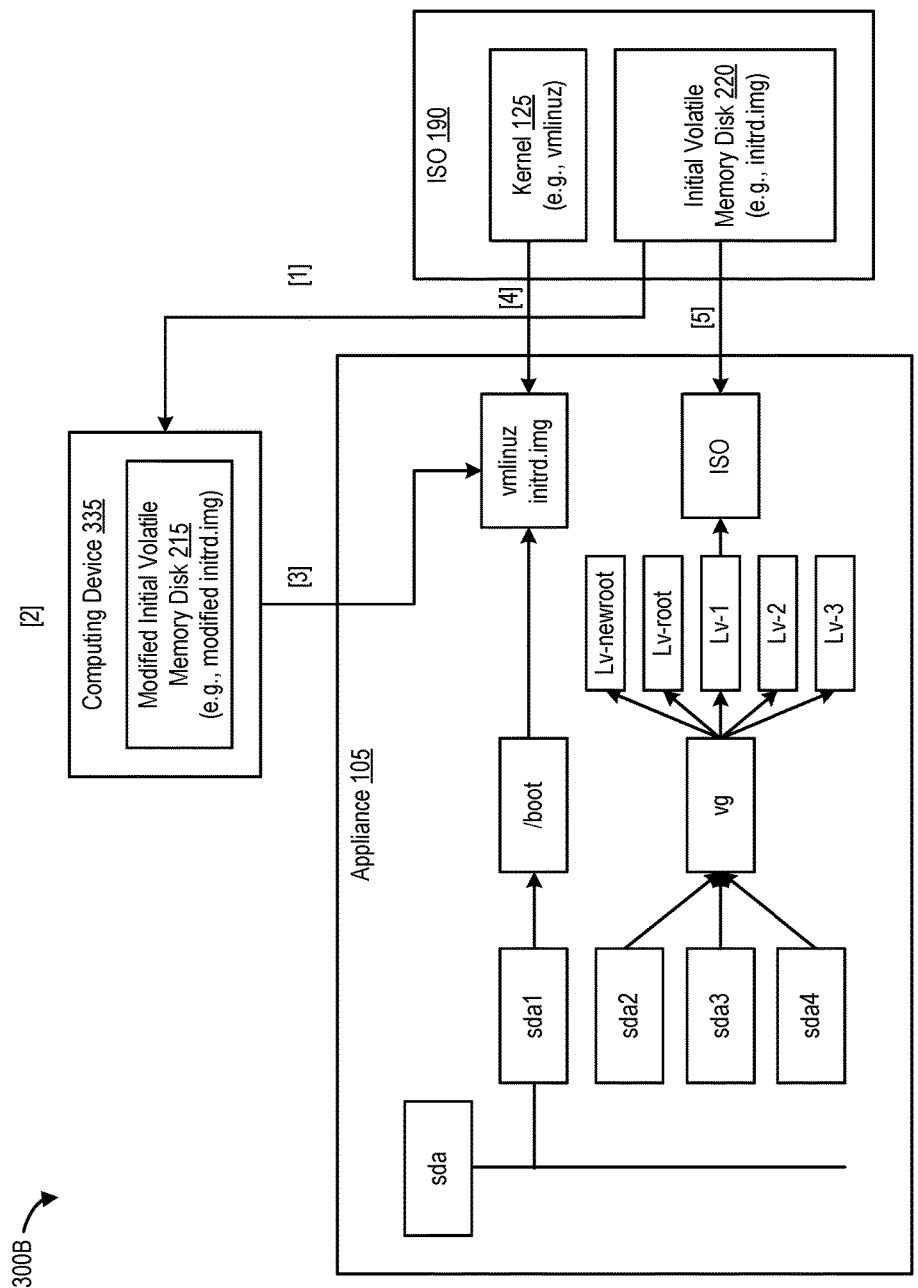
FIG. 3B is a block diagram 300B of computing devices that modify an initial volatile memory disk and prepare a new OS installation, according to one embodiment of the present disclosure.

FIG. 3B is a block diagram 300B of computing systems that modify an initial volatile memory disk and prepare a new OS installation, according to one embodiment. As shown in FIG. 3B, ISO 190 is an ISO image of an OS distribution that can be used to install an OS on some type of computing device (e.g., a laptop, a PC, a server, an appliance, and the like). In this example, appliance 105 can be any computing device other than computing device 335 that is configured to operate in an LVM-based storage environment. It should be noted that sda1 (e.g., local disk 305 as shown in FIG. 3A) is not created as a physical volume. Sda2, sda3, and sda4 are created as physical volumes (e.g., physical volumes 175(2), 175(3), and 175(4) as shown in FIG. 3A) and added into vg (e.g., volume group 180 as shown in FIG. 3A). Initial volatile memory disk 220 (e.g., initrd.img) is an initial ramdisk file (e.g., an initial volatile memory disk after initrd.img is loaded into memory of computing device 335).

In certain embodiments, computing device 335 extracts (e.g., [1] in FIG. 3B) initial volatile memory disk (e.g., extracts initrd.img from ISO), and modifies (e.g., [2] in FIG. 3B) the extracted initial volatile memory disk to generate modified initial volatile memory disk 215. The modification operation includes decompressing the initial volatile memory disk, adding a logical volume binary and shared binaries, activating logical volume management in a software program of hard drive based installation, and repackaging the initial volatile memory disk (e.g., to create modified initial volatile memory disk 215). Next, the modified initial volatile memory disk (e.g., the modified initial ramdisk) is copied to a boot partition of appliance 105 (e.g., [3] in FIG. 3B), and the original kernel (e.g., vmlinuz/kernel 125) in ISO 190 is copied to the boot partition (e.g., [4] in FIG. 3B). Finally, the original ISO (e.g., ISO 190) is copied to a logical volume (e.g., [5] in FIG. 3B). It should be noted that only the initial ramdisk extracted from the original ISO is modified, and thus, is no need to put the modified initial ramdisk back into the original ISO.

In some embodiments, after copying the kernel (e.g., vmlinuz/kernel 125) from original ISO (e.g., ISO 190), copying the modified initial volatile memory disk (e.g., modified initial ramdisk) into the boot partition, and copying the original ISO into a logical volume, a new OS installation can be started from the LVM partition. Examples processes to perform OS installation using logical volumes are described next.

Example Processes to Perform OS Installation Using Logical Volumes

Figure 4:
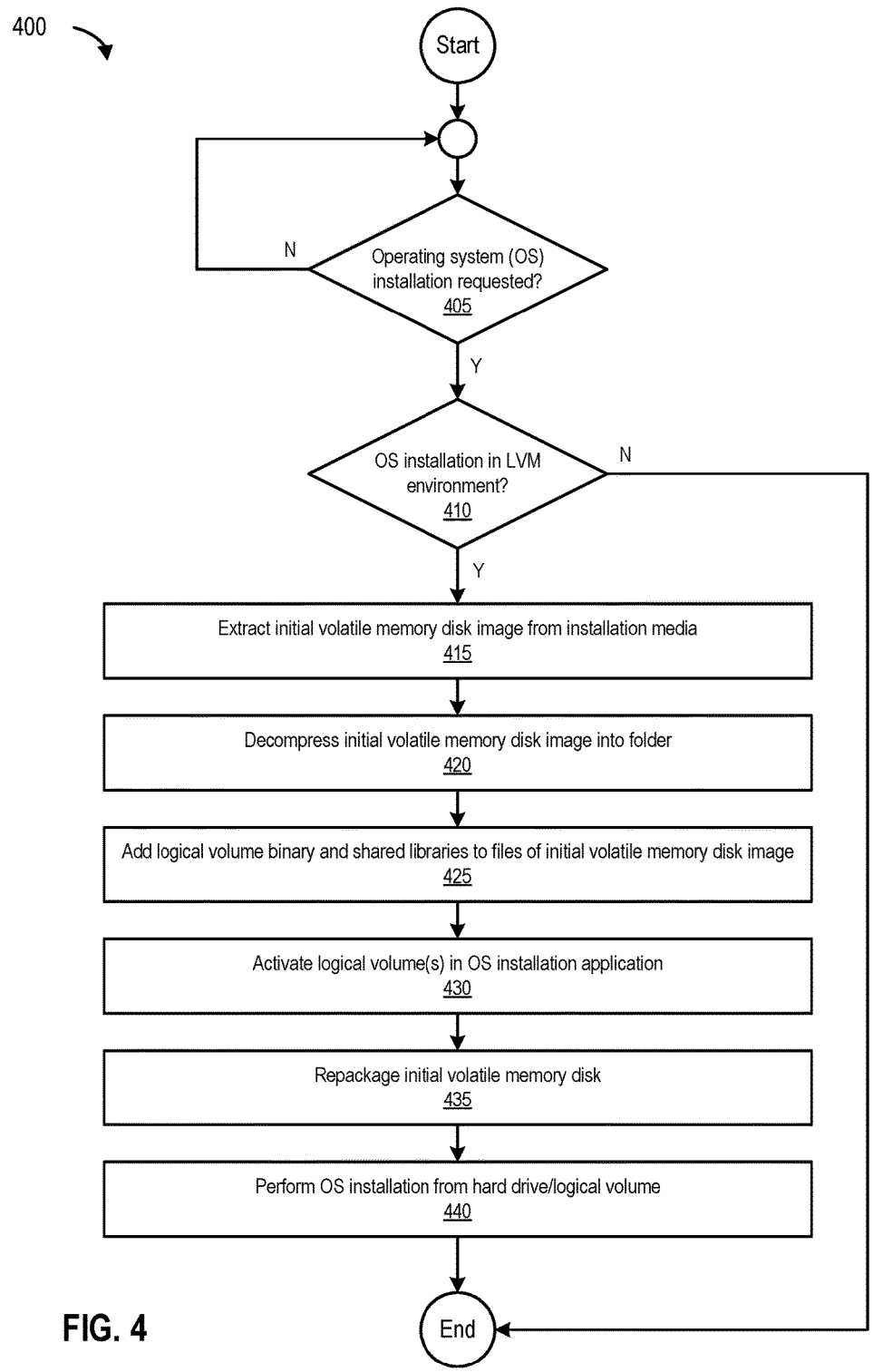
FIG. 4 is a flowchart 400 of a process for performing OS installation from a hard drive in LVM storage environments, according to one embodiment of the present disclosure.

FIG. 4 is a flowchart 400 of a process for performing OS installation from a hard drive in LVM-based storage environments, according to one embodiment. The process begins at 405 by determining if an operating system (OS) installation is requested. If no OS installation is requested, the process loops back to 405. However, if an OS installation is requested, the process, at 410, determines whether OS installation is to performed in an LVM-based storage environment. If not, the process ends.

However, if the OS installation is to be performed in an LVM-based storage environment, the process, at 415, extracts an initial volatile memory disk image (e.g., initrd.img) from installation media (e.g., from ISO 190). At 420, the process decompresses the extracted initial volatile memory disk into a folder (e.g., on computing device 335). At 425, the process adds a logical volume binary (e.g., logical volume binary 240) and shared libraries (e.g., shared libraries 130(1)-(N)) to files of the extracted initial volatile memory disk image. At 430, the process activates logical volume(s) in an OS installation application (e.g., OS installation application 230). At 435, the process repackages the initial volatile memory disk (e.g., to generate modified initial volatile memory disk 215). The process ends at 440 by performing OS installation from a hard drive (e.g., from a logical volume).

Figure 5:
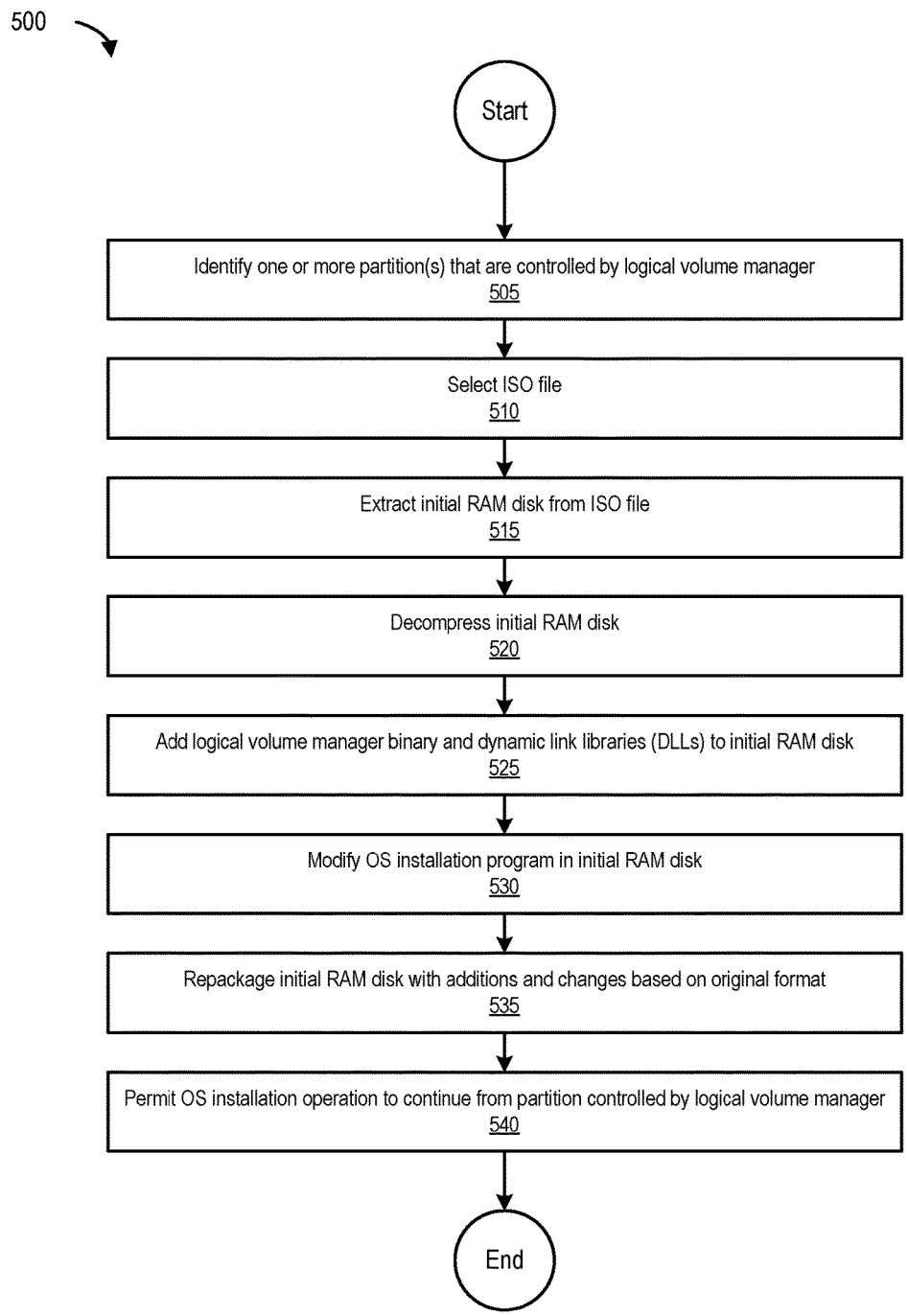
FIG. 5 is a flowchart 500 of a process for generating a customized initial ramdisk, according to one embodiment of the present disclosure.

FIG. 5 is a flowchart 500 of a process generating a customized initial ramdisk to support OS installation from an LVM partition, according to one embodiment. The process begins at 505 by identifying one or more partitions that are controlled by a logical volume manager (e.g., logical volume 185(1) of FIG. 3A or Lv-1 of FIG. 3B).

At 510, the process selects an ISO file (e.g., ISO 190). At 515, the process extracts an initial RAM disk (e.g., initial volatile memory disk 220/initrd.img) from the ISO file. At 520, the process decompresses the initial RAM disk, and at 525, adds a logical volume binary and dynamic link libraries (DLLs) to the extracted initial RAM disk. At 530, the process modifies an OS installation program in the extracted initial RAM disk, and at 535, repackages the initial RAM disk with additions and changes based on original format. At 540, the process permits an OS installation operation to continue from a partition controlled by the logical volume manager. It should be noted that the process of FIG. 5 generates a customized initial RAM disk to support OS installation from an LVM-controlled partition (e.g., the OS installation is not started).

Figure 6:
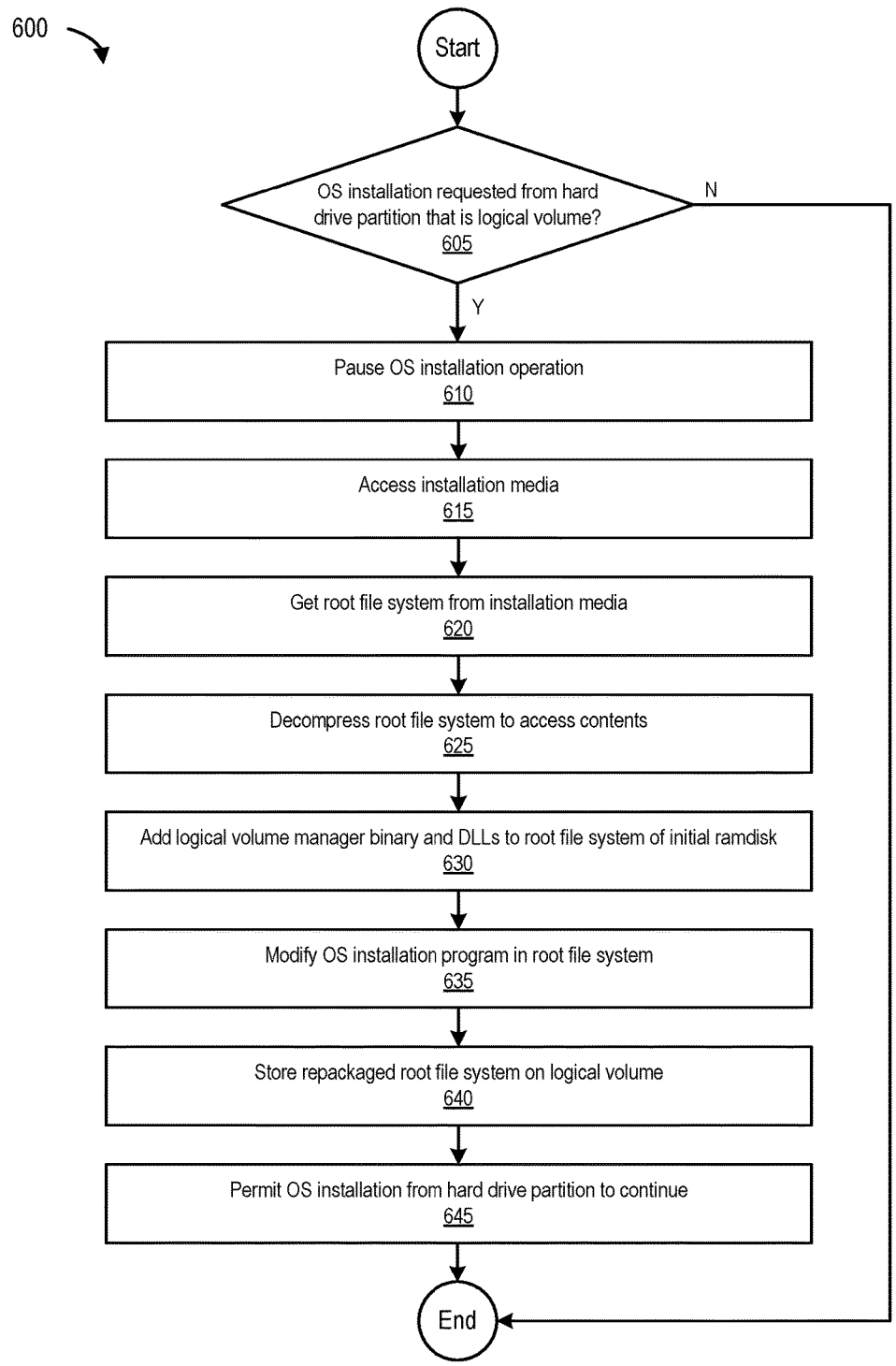
FIG. 6 is a flowchart 600 of a process for generating a modified initial volatile memory disk, according to one embodiment of the present disclosure.

FIG. 6 is a flowchart 600 of a process for generating a modified initial volatile memory disk, according to one embodiment. The process begins at 605 by determining whether an OS installation is requested from a hard drive partition that is a logical volume. If the OS installation is not requested from a hard drive partition that is a logical volume, the process ends. However, if the OS installation is requested from a hard drive partition that is a logical volume, the process, at 610, pauses the OS installation operation. At 615, the process accesses installation media (e.g., ISO 190), and at 620, the process gets (extracts) a root file system from the installation media (e.g., the initial volatile memory disk/initial ramdisk).

At 625, the process decompresses the root file system to access the root file system's contents (e.g., drivers, OS installation application, and the like). At 630, the process adds a logical volume binary as well as DLLs to the root file system of the initial ramdisk. It should be noted that the logical volume binary and the DLLs are not added to the root file system of an ISO. Instead, the initial ramdisk is extracted from an ISO, and the logical volume binary (e.g., a volume manager binary) as well as the DLLs are added to a root file system of the initial ramdisk. Therefore, there is no need to generate a new ISO because an existing initial ramdisk can be modified to generate a new/modified initial ramdisk. At 635, the process modifies an OS installation program in the root file system, and at 640 stores the repackaged root file system on a logical volume. The process ends at 645 by permitting the (paused) OS installation from a hard drive partition to continue.

Figure 7A:
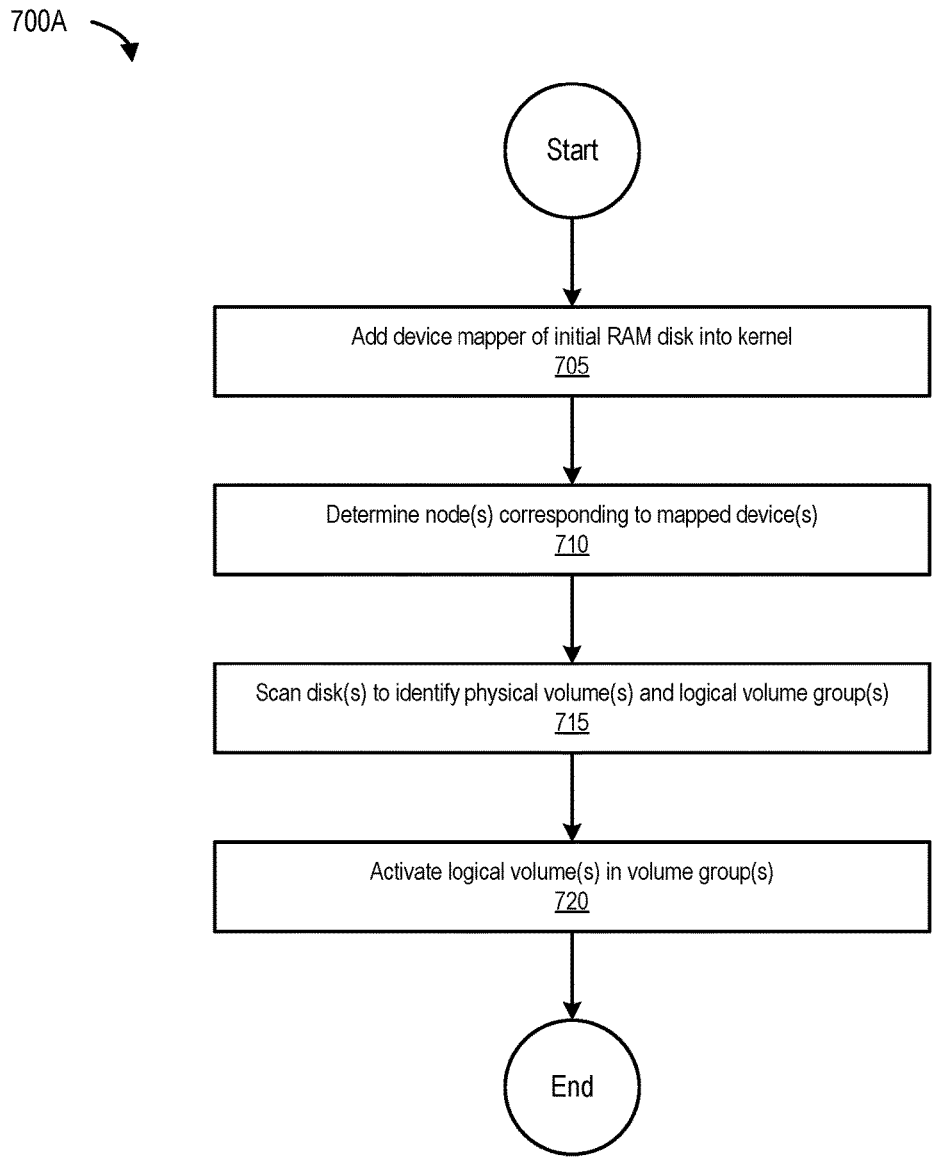
FIG. 7A is a flowchart 700A of a process for activating a logical volume, according to one embodiment of the present disclosure.

FIG. 7A is a flowchart 700A of a process for activating a logical volume, according to one embodiment. The process begins at 705 by adding a device mapper of an initial ramdisk into a kernel (e.g., modprobe dm_mod). At 710, the process determines node(s) that correspond to mapped device(s) (e.g., dmsetup mknodes). At 715, the process scans disk(s) to identify physical volumes and logical volume group(s) (e.g., vgscan). The process ends at 720 by activating logical volume(s) in volume group(s) (e.g., vgchange-ay).

Figure 7B:
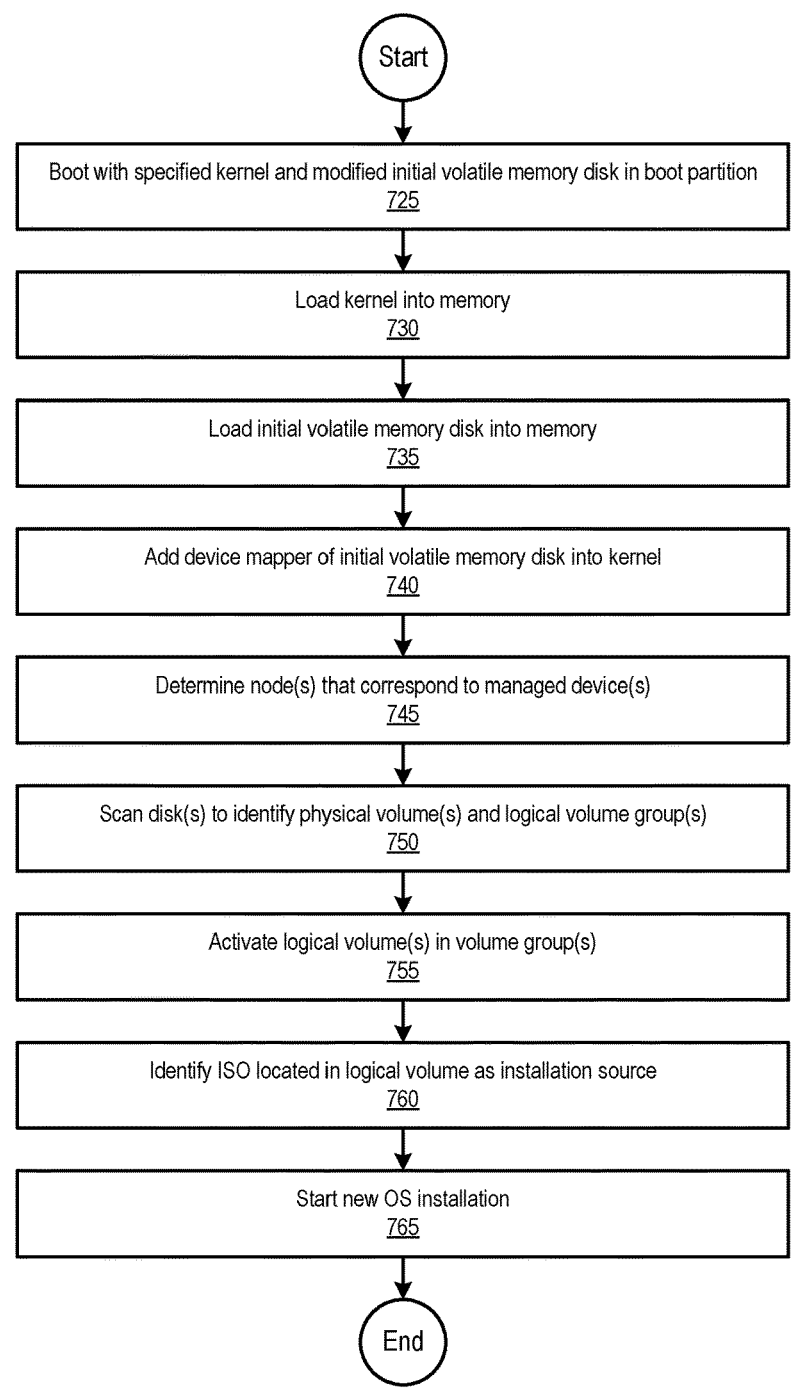
FIG. 7B is a flowchart 700B of a process for starting a new OS installation from an LVM partition, according to one embodiment of the present disclosure.

FIG. 7B is a flowchart 700B of a process for starting a new OS installation from an LVM partition, according to one embodiment. The process begins at 725 by booting (e.g., appliance 105) with a specified kernel (e.g., vmlinuz) and with a modified initial volatile memory disk (e.g., modified initrd.img) in a boot partition (e.g., /boot). At 730, the process loads the kernel into memory, and at 735, loads the (modified) initial volatile memory disk into memory. By loading the kernel and the modified initial ramdisk into memory, the process of FIG. 7B triggers a hard drive based installation program.

At 740, the process adds a device mapper of the initial volatile memory disk into memory, and at 745, the process determines (or identifies) node(s) that correspond to managed device(s) (e.g., to ensure that nodes in /dev/mapper correspond to mapped devices currently loaded by the device mapper kernel driver by adding, changing, or removing node(s) as necessary). At 750, the process scans disk(s) to identify physical volume(s) and logical volume group(s), ant at 755, the process activates logical volume(s) in volume group(s). At 760, the process identifies an ISO located in a logical volume as an installation source, and ends at 765 by starting a new OS installation from the logical volume.

Therefore, it will be appreciated that the methods, systems, and processes described herein at least permit the modification of an initial RAM disk and prepare a new OS installation. In addition, the methods, systems, and processes described herein also at least permit a new OS installation to start in an appliance (e.g., a Linux server, and the like) that operates in an LVM-based storage environment.

Example Computing Environment

Figure 8:
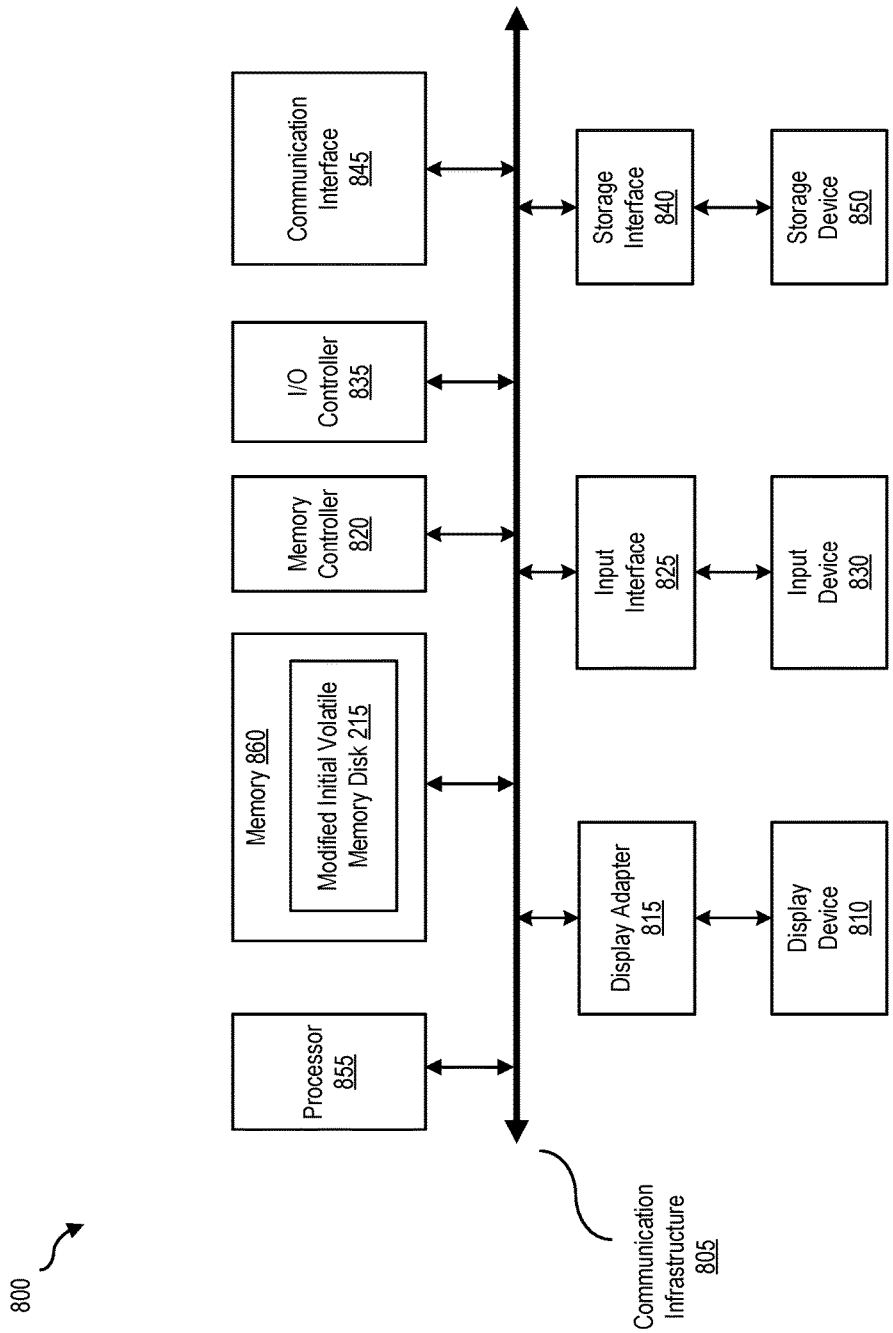
FIG. 8 is a block diagram of a computing system 800 that performs data replication between heterogeneous storage servers, according to one embodiment of the present disclosure.

FIG. 8 is a block diagram of a computing system 800 that permits OS installation from LVM-controlled hard drive partitions, according to one embodiment. Computing system 800 can include appliance 105 and/or computing device 335, and broadly represents any single or multi-processor computing device or system capable of executing computer-readable instructions. Examples of computing system 800 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 800 may include at least one processor 855 and a memory 860. By executing the software that modifies an extracted initial ramdisk, computing system 800 becomes a special purpose computing device that is configured to modify an initial RAM disk, prepare a new OS installation, and permit the new OS installation to start in an appliance (e.g., appliance 105).

Processor 855 generally represents any type or form of processing unit capable of processing data or interpreting and executing instructions. In certain embodiments, processor 855 may receive instructions from a software application or module. These instructions may cause processor 855 to perform the functions of one or more of the embodiments described and/or illustrated herein. For example, processor 855 may perform and/or be a means for performing all or some of the operations described herein. Processor 855 may also perform and/or be a means for performing any other operations, methods, or processes described and/or illustrated herein.

Memory 860 (e.g., memory 115 of appliance 105 or a memory of computing device 335) generally represents any type or form of volatile or non-volatile storage devices or mediums capable of storing data and/or other computer-readable instructions. Examples include, without limitation, random access memory (RAM), read only memory (ROM), flash memory, or any other suitable memory device. Although not required, in certain embodiments computing system 800 may include both a volatile memory unit and a non-volatile storage device. In one example, program instructions implementing an OS installer 155 may be loaded into memory 860.

In certain embodiments, computing system 800 may also include one or more components or elements in addition to processor 855 and/or memory 860. For example, as illustrated in FIG. 8, computing system 800 may include a memory controller 820, an Input/Output (I/O) controller 835, and a communication interface 845, each of which may be interconnected via a communication infrastructure 805. Communication infrastructure 805 generally represents any type or form of infrastructure capable of facilitating communication between one or more components of a computing device. Examples of communication infrastructure 805 include, without limitation, a communication bus (such as an Industry Standard Architecture (ISA), Peripheral Component Interconnect (PCI), PCI express (PCIe), or similar bus) and a network.

Memory controller 820 generally represents any type/form of device capable of handling memory or data or controlling communication between one or more components of computing system 800. In certain embodiments memory controller 820 may control communication between processor 855, memory 860, and I/O controller 835 via communication infrastructure 805. In certain embodiments, memory controller 820 may perform and/or be a means for performing, either alone or in combination with other elements, one or more of the operations or features described and/or illustrated herein.

I/O controller 835 generally represents any type or form of module capable of coordinating and/or controlling the input and output functions of an appliance and/or a computing device. For example, in certain embodiments I/O controller 835 may control or facilitate transfer of data between one or more elements of computing system 800, such as processor 855, memory 860, communication interface 845, display adapter 815, input interface 825, and storage interface 840.

Communication interface 845 broadly represents any type or form of communication device or adapter capable of facilitating communication between computing system 800 and one or more other devices. Communication interface 845 may facilitate communication between computing system 800 and a private or public network including additional computing systems. Examples of communication interface 845 include, without limitation, a wired network interface (such as a network interface card), a wireless network interface (such as a wireless network interface card), a modem, and any other suitable interface. Communication interface 845 may provide a direct connection to a remote server via a direct link to a network, such as the Internet, and may also indirectly provide such a connection through, for example, a local area network (e.g., an Ethernet network), a personal area network, a telephone or cable network, a cellular telephone connection, a satellite data connection, or any other suitable connection.

Communication interface 845 may also represent a host adapter configured to facilitate communication between computing system 800 and one or more additional network or storage devices via an external bus or communications channel. Examples of host adapters include, Small Computer System Interface (SCSI) host adapters, Universal Serial Bus (USB) host adapters, Institute of Electrical and Electronics Engineers (IEEE) 1394 host adapters, Serial Advanced Technology Attachment (SATA), Serial Attached SCSI (SAS), and external SATA (eSATA) host adapters, Advanced Technology Attachment (ATA) and Parallel ATA (PATA) host adapters, Fibre Channel interface adapters, Ethernet adapters, or the like. Communication interface 845 may also allow computing system 800 to engage in distributed or remote computing (e.g., by receiving/sending instructions to/from a remote device for execution).

As illustrated in FIG. 8, computing system 800 may also include at least one display device 810 coupled to communication infrastructure 805 via a display adapter 815. Display device 810 generally represents any type or form of device capable of visually displaying information forwarded by display adapter 815. Similarly, display adapter 815 generally represents any type or form of device configured to forward graphics, text, and other data from communication infrastructure 805 (or from a frame buffer, as known in the art) for display on display device 810. Computing system 800 may also include at least one input device 830 coupled to communication infrastructure 805 via an input interface 825. Input device 830 generally represents any type or form of input device capable of providing input, either computer or human generated, to computing system 800. Examples of input device 830 include a keyboard, a pointing device, a speech recognition device, or any other input device.

Computing system 800 may also include storage device 850 coupled to communication infrastructure 805 via a storage interface 840. Storage device 850 generally represents any type or form of storage devices or mediums capable of storing data and/or other computer-readable instructions. For example, storage device 850 may include a magnetic disk drive (e.g., a so-called hard drive), a floppy disk drive, a magnetic tape drive, an optical disk drive, a flash drive, or the like. Storage interface 840 generally represents any type or form of interface or device for transferring and/or transmitting data between storage device 850, and other components of computing system 800. Storage device 850 may be configured to read from and/or write to a removable storage unit configured to store computer software, data, or other computer-readable information. Examples of suitable removable storage units include a floppy disk, a magnetic tape, an optical disk, a flash memory device, or the like. Storage device 850 may also include other similar structures or devices for allowing computer software, data, or other computer-readable instructions to be loaded into computing system 800. For example, storage device 850 may be configured to read and write software, data, or other computer-readable information. Storage device 850 may also be a part of computing system 800 or may be separate devices accessed through other interface systems.

Many other devices or subsystems may be connected to computing system 800. Conversely, all of the components and devices illustrated in FIG. 8 need not be present to practice the embodiments described and/or illustrated herein. The devices and subsystems referenced above may also be interconnected in different ways from that shown in FIG. 8.

Computing system 800 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 800 for storage in memory via a network such as the Internet or upon a carrier medium.

The computer-readable medium containing the computer program may be loaded into computing system 800. All or a portion of the computer program stored on the computer-readable medium may then be stored in memory 860 and/or various portions of storage device 850. When executed by processor 855, a computer program loaded into computing system 800 may cause processor 855 to perform and/or be a means for performing the functions of one or more of the embodiments described and/or illustrated herein. Additionally or alternatively, one or more of the embodiments described and/or illustrated herein may be implemented in firmware and/or hardware. For example, computing system 800 may be configured as an application specific integrated circuit (ASIC) adapted to implement one or more of the embodiments disclosed herein.

Example Networking Environment

Figure 9:
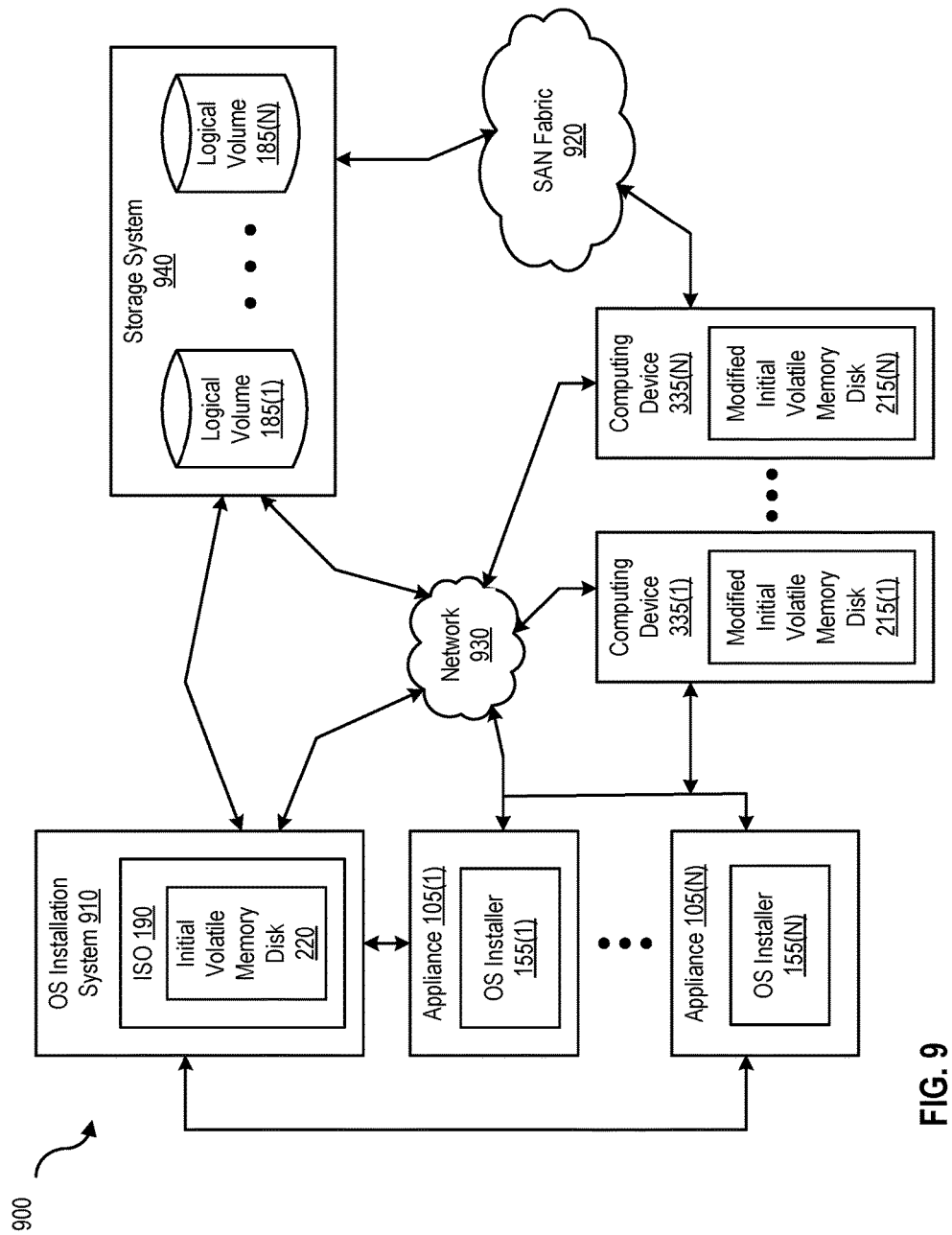
FIG. 9 is a block diagram of a network system 900, according to one embodiment of the present disclosure.

FIG. 9 is a block diagram of a networking system 900, according to one embodiment. In certain embodiments, network-attached storage (NAS) devices may be configured to communicate with appliances 105(1)-(N), computing devices 335(1)-(N), and/or OS installation system 910 using various protocols, such as Network File System (NFS), Server Message Block (SMB), or Common Internet File System (CIFS). Network 930 generally represents any type or form of computer network or architecture capable of facilitating communication between appliances 105(1)-(N), computing devices 335(1)-(N), and/or OS installation system 910.

In certain embodiments, a communication interface, such as communication interface 845 in FIG. 8, may be used to provide connectivity between appliances 105(1)-(N), computing devices 335(1)-(N), and/or OS installation system 910, and network 930. It should be noted that the embodiments described and/or illustrated herein are not limited to the Internet or any particular network-based environment. For example, network 930 can be a Storage Area Network (SAN). In some embodiments, OS installation system 910 may be part of computing devices 335(1)-(N), or may be separate. If separate, OS installation 910 and computing devices 335(1)-(N) may be communicatively coupled via network 930.

In one embodiment, all or a portion of one or more of the disclosed embodiments may be encoded as a computer program and loaded onto and executed by appliances 105(1)-(N), computing devices 335(1)-(N), and/or OS installation system 910, or any combination thereof. All or a portion of one or more of the embodiments disclosed herein may also be encoded as a computer program, stored on appliances 105(1)-(N), computing devices 335(1)-(N), and/or OS installation system 910, and distributed over network 930.

In some examples, all or a portion of appliances 105(1)-(N), computing devices 335(1)-(N), and/or OS installation system 910 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface.

Various functions described herein may be provided through a remote desktop environment or any other cloud-based computing environment. In addition, one or more of the components described herein may transform data, physical devices, and/or representations of physical devices from one form to another. For example, computing devices 335(1)-(N) may transform the behavior of appliances 105(1)-(N) in order to cause appliances 105(1)-(N) to perform OS installation from one or more LVM-controlled hard drive partitions.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A method comprising:
   extracting an initial volatile memory disk from an operating system (OS) installation image, wherein
      the initial volatile memory disk comprises an OS installation application;
   adding a logical volume binary and one or more shared libraries to the extracted initial volatile memory disk; and
   repackaging the extracted initial volatile memory disk into a modified initial volatile memory disk.

2. The method of claim 1, further comprising:
   executing the logical volume binary and the one or more shared libraries, wherein the executing modifies a process performed by the OS installation application.

3. The method of claim 2, further comprising:
   storing a kernel and the repackaged initial volatile memory disk on a boot partition;
   storing an ISO image on a logical volume, wherein; and
   permitting an OS installation operation from the logical volume as part of the process.

4. The method of claim 3, wherein
   modifying the process in the OS installation application comprises
      adding a device mapper to a kernel of an OS, wherein
         the OS boots a computing device, and
         the computing device performs the OS installation operation; and
      determining that one or more nodes listed in the device mapper correspond to one or more mapped devices loaded by the device mapper.

5. The method of claim 4, wherein
   modifying the process in the OS installation application further comprises
      scanning one or more sub disks associated with the computing device to identify one or more physical volumes and one or more logical volume groups, and
      activating each logical volume in the one or more logical volume groups by executing the logical volume binaries.

6. The method of claim 5, wherein
   the process comprises performing the OS installation operation by installing or updating the OS of the computing device from the logical volume associated with the computing device.

7. A non-transitory computer readable storage medium comprising program instructions executable to:
   extract an initial volatile memory disk from an operating system (OS) installation image, wherein
      the initial volatile memory disk comprises an OS installation application;
   add a logical volume binary and one or more shared libraries to the extracted initial volatile memory disk; and repackage the extracted initial volatile memory disk into a modified initial volatile memory disk.

8. The non-transitory computer readable storage medium of claim 7, further comprising:
executing the logical volume binary and the one or more shared libraries, wherein the executing modifies a process performed by the OS installation application.

9. The non-transitory computer readable storage medium of claim 8, further comprising:
storing a kernel and the repackaged initial volatile memory disk on a boot partition;
storing an ISO image on a logical volume; and
permitting an OS installation operation from the logical volume as part of the process.

10. The non-transitory computer readable storage medium of claim 9, wherein
modifying the process in the OS installation application comprises
adding a device mapper to a kernel of an OS, wherein
the OS boots a computing device, and
the computing device performs the OS installation operation; and
determining that one or more nodes listed in the device mapper correspond to one or more mapped devices loaded by the device mapper.

11. The non-transitory computer readable storage medium of claim 10, wherein
modifying the process in OS installation application further comprises
scanning one or more sub disks associated with the computing device to identify one or more physical volumes and one or more logical volume groups, and
activating each logical volume in the one or more logical volume groups by executing the logical volume binaries.

12. The non-transitory computer readable storage medium of claim 11, wherein
the process comprises performing the OS installation operation by installing or updating the OS of the computing device from the logical volume associated with the computing device.

13. A system comprising:
one or more processors; and
a memory coupled to the one or more processors, wherein the memory stores program instructions executable by the one or more processors to:
extract an initial volatile memory disk from an operating system (OS) installation image, wherein
the initial volatile memory disk comprises an OS installation application;
add a logical volume binary and one or more shared libraries to the extracted initial volatile memory disk; and
repackage the extracted initial volatile memory disk into a modified initial volatile memory disk.

14. The system of claim 13, further comprising:
executing the logical volume binary and the one or more shared libraries, wherein the executing modifies a process performed by the OS installation application.

15. The system of claim 14, further comprising:
storing a kernel and the repackaged initial volatile memory disk on a boot partition;
storing an ISO image on a logical volume; and
permitting an OS installation operation from the logical volume as part of the process.

16. The system of claim 15, wherein
modifying the process in OS installation application comprises
adding a device mapper to a kernel of an OS, wherein
the OS boots a computing device, and
the computing device performs the OS installation operation; and
determining that one or more nodes listed in the device mapper correspond to one or more mapped devices loaded by the device mapper.

17. The system of claim 16, wherein
modifying the process in OS installation application further comprises
scanning one or more sub disks associated with the computing device to identify one or more physical volumes and one or more logical volume groups, and
activating each logical volume in the one or more logical volume groups by executing the logical volume binaries.

18. The system of claim 17, wherein
the process comprises performing the OS installation operation by installing or updating the OS of the computing device from the logical volume associated with the computing device.

* * * * *